(12) United States Patent
Mullaney et al.

(10) Patent No.: US 12,333,526 B2
(45) Date of Patent: Jun. 17, 2025

(54) SYSTEMS AND METHODS FOR PAYMENT TOKEN PROVISIONING WITH VARIABLE RISK EVALUATION

(71) Applicant: JPMORGAN CHASE BANK, N.A., New York, NY (US)

(72) Inventors: Craig M. Mullaney, Newark, DE (US); David Christopher Carey, Middletown, DE (US); Sridhar Aravamudhan, Middletown, DE (US); Julia Elyasheva, Woodmere, NY (US); Alwin M. Thomas, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 142 days.

(21) Appl. No.: 17/159,457

(22) Filed: Jan. 27, 2021

(65) Prior Publication Data

US 2021/0233066 A1     Jul. 29, 2021

Related U.S. Application Data

(60) Provisional application No. 62/966,400, filed on Jan. 27, 2020.

(51) Int. Cl.
*G06Q 20/36* (2012.01)
*G06Q 20/02* (2012.01)
(Continued)

(52) U.S. Cl.
CPC ......... *G06Q 20/3674* (2013.01); *G06Q 20/02* (2013.01); *G06Q 20/3224* (2013.01);
(Continued)

(58) Field of Classification Search
None
See application file for complete search history.

(56) References Cited

U.S. PATENT DOCUMENTS 10,366,378 B1 *   7/2019   Han ................... G06Q 20/204
10,412,060 B2 *   9/2019   Narayan ................ H04L 9/14
(Continued)

OTHER PUBLICATIONS

International Search Report, dated May 4, 2021, from corresponding International Application No. PCT/US2021/015201.
(Continued)

*Primary Examiner* — Christopher Bridges
(74) *Attorney, Agent, or Firm* — GREENBERG TRAURIG LLP (57) ABSTRACT

Systems and methods for payment token provisioning with variable risk evaluation are disclosed. In one embodiment, a method may include: an issuer backend: (1) receiving, from an electronic wallet application, a payload comprising an identification of a card to be provisioned to the mobile electronic device; (2) determining that the card is eligible for provisioning to the mobile electronic device; (3) generating a card payload and communicating the card payload to the payment network, wherein the payment network creates a payment token for the card comprising payment token origin information; (4) receiving the payment token from the payment network and generating a risk profile for the payment token; and (5) activating the payment token in response to the validation.

17 Claims, 5 Drawing Sheets

(51) Int. Cl.
  *G06Q 20/32* (2012.01)
  *G06Q 20/38* (2012.01)
  *G06Q 20/40* (2012.01)
  *G06F 16/955* (2019.01)
  *G06Q 40/02* (2023.01)

(52) U.S. Cl.
  CPC ....... *G06Q 20/326* (2020.05); *G06Q 20/3672* (2013.01); *G06Q 20/385* (2013.01); *G06Q 20/40145* (2013.01); *G06Q 20/4016* (2013.01); *G06Q 20/405* (2013.01); *G06F 16/955* (2019.01); *G06Q 40/02* (2013.01)

(56) References Cited

U.S. PATENT DOCUMENTS

| | | | |
|---|---|---|---|
| 10,891,620 B2* | 1/2021 | Meng | G06Q 20/341 |
| 10,904,002 B2* | 1/2021 | Palanisamy | G06F 21/44 |
| 10,949,851 B2* | 3/2021 | John | G06Q 20/425 |
| 11,341,491 B2* | 5/2022 | Raj | G06Q 20/3821 |
| 2015/0046339 A1* | 2/2015 | Wong | G06Q 20/322 |
| | | | 705/44 |
| 2015/0294306 A1* | 10/2015 | Grigg | G06Q 20/4016 |
| | | | 705/67 |
| 2017/0091759 A1* | 3/2017 | Selfridge | G06Q 20/385 |
| 2017/0270517 A1* | 9/2017 | Vasu | G06Q 20/4018 |

OTHER PUBLICATIONS

Written Opinion of the International Searching Authority, dated May 4, 2021, from corresponding International Application No. PCT/US2021/015201.

\* cited by examiner

SYSTEMS AND METHODS FOR PAYMENT TOKEN PROVISIONING WITH VARIABLE RISK EVALUATION

RELATED APPLICATIONS

This application claims priority to, and the benefit of, U.S. Provisional Patent Application Ser. No. 62/966,400, filed Jan. 27, 2020, the disclosure of which is hereby incorporated, by reference, in its entirety.

BACKGROUND OF THE INVENTION

1. Field of the Invention

Embodiments generally relate to systems and methods for payment token provisioning with variable risk evaluation.

2. Description of the Related Art

Payment tokens are routinely provisioned to mobile electronic devices, such as smartphones. These payment tokens add convenience to the payment process, where instead of having to swipe or tap a card, the cardholder simply presents the mobile electronic device to the point of sale device, and the payment token is wirelessly transmitted to the point of sale device. This also increases the security of the transaction, as the cardholder is often required to authenticate him or herself to the mobile electronic device before the payment token can be transmitted.

SUMMARY OF THE INVENTION

Systems and methods for payment token provisioning with variable risk evaluation are disclosed. In one embodiment, a method for payment token provisioning with variable risk evaluation may include: (1) an issuer backend comprising at least one computer processor receiving, from an electronic wallet application executed by a mobile electronic device and from a payment network, a payload comprising an identification of a card to be provisioned to the mobile electronic device, wherein the card is issued to a cardholder; (2) the issuer backend determining that the card is eligible for provisioning to the mobile electronic device; (3) the issuer backend generating a card payload and communicating the card payload to the payment network, wherein the card payload comprises a subset of the payload received from the electronic wallet application, and the payment network creates a payment token for the card comprising payment token origin information; (4) the issuer backend receiving the payment token from the payment network and generating a risk profile for the payment token, wherein the risk profile is associated with at least one restriction on using the payment token; (5) the issuer backend receiving a one-time passcode from the payment network; (6) the issuer backend sending the one-time passcode to contact information for the cardholder, wherein the cardholder enters the one-time passcode to the electronic wallet application, and the electronic wallet application forwards the entered one-time passcode to the payment network for validation; and (7) the issuer backend activating the payment token in response to the validation.

In one embodiment, the payload received from the electronic wallet application further may include a device-bound payload, and the payment token may be bound to the mobile electronic device. In another embodiment, the payload received from the electronic wallet application further may include a service-bound payload, and the payment token bound to a merchant.

In one embodiment, the payment token origin information may include at least one of an identification of the electronic wallet, an identification of the issuer, an identification of the payment network, an identification of at least one application installed on the mobile electronic device, a trustworthiness of the at least one installed application, a location of the mobile electronic device when the payload comprising an identification of the card to be provisioned to the mobile electronic device was sent, whether the payment token is being provisioned in-flight, and any in-flight information.

In one embodiment, the risk profile may be based on at least one of a wallet score for the electronic wallet, a device score for the mobile electronic device, a transaction history for the card, and a profile score for the cardholder.

In one embodiment, the at least one restriction may include a transaction dollar amount limit, a number of transactions limit, etc.

According to another embodiment, a method for conducting a transaction with variable-risk payment token may include: (1) an issuer backend comprising at least one computer processor receiving, from a merchant and via a payment network, a transaction and a variable-risk payment token presented by a cardholder for the transaction using a mobile electronic device; (2) the issuer backend retrieving a risk profile associated with the variable-risk payment token; (3) the issuer backend determining that the transaction is outside of the risk profile; (4) the issuer backend requesting additional authentication from the cardholder; (5) the issuer backend receiving the additional authentication from the cardholder; and (6) the issuer backend authorizing the transaction.

In one embodiment, the payment network may perform domain-specific authorization on the variable-risk payment token.

In one embodiment, the risk profile may be retrieved from a token vault.

In one embodiment, the risk profile may be based on payment token origin information.

In one embodiment, the token origin information may include at least one of an identification of the electronic wallet, an identification of the issuer, an identification of the payment network, an identification of at least one application installed on the mobile electronic device, a trustworthiness of the at least one installed application, a location of the mobile electronic device, whether the payment token is being provisioned in-flight, and any in-flight information.

In one embodiment, the transaction is outside of the risk profile when it is above a transaction amount limit, when it is above a transaction number limit, etc.

In one embodiment, the additional authentication may include at least one of out-of-band authentication, biometric authentication, and in-app authentication using an application on the mobile electronic device.

According to another embodiment, a method for payment token provisioning with variable risk evaluation may include: (1) a third-party processor backend for an issuer comprising at least one computer processor receiving, from an electronic wallet application executed by a mobile electronic device and from a payment network, a payload comprising an identification of a card to be provisioned to the mobile electronic device, wherein the card is issued to a cardholder; (2) the third-party processor backend that the card is eligible for provisioning to the mobile electronic device; (3) the third-party processor backend a card payload and communicating the card payload to the payment network, wherein the card payload may include a subset of the payload received from the electronic wallet application, and the payment network creates a payment token for the card comprising payment token origin information (4) the third-party processor backend the payment token from the payment network and generating a risk profile for the payment token, wherein the risk profile is associated with at least one restriction on using the payment token, and wherein the risk profile is generated by the issuer backend; (5) the third-party processor backend receiving a one-time passcode from the payment network; (6) the third-party processor backend sending the one-time passcode to contact information for the cardholder, wherein the cardholder enters the one-time passcode to the electronic wallet application, and the electronic wallet application forwards the entered one-time passcode to the payment network for validation; and (7) the third-party processor backend activating the payment token in response to the validation.

In one embodiment, the third-party processor backend retrieves the contact information for the cardholder from the issuer backend.

In one embodiment, the payload received from the electronic wallet application further may include a device-bound payload or a service-bound payload, wherein the device-bound payload binds the payment token to the mobile electronic device, and the service-bound payload binds the payment token to a merchant.

In one embodiment, the payment token origin information may include at least one of an identification of the electronic wallet, an identification of the issuer, an identification of the payment network, an identification of at least one application installed on the mobile electronic device, a trustworthiness of the at least one installed application, a location of the mobile electronic device when the payload comprising an identification of the card to be provisioned to the mobile electronic device was sent, whether the payment token is being provisioned in-flight, and any in-flight information.

In one embodiment, the risk profile may be based on at least one of a wallet score for the electronic wallet, a device score for the mobile electronic device, a transaction history for the card, and a profile score for the cardholder.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for payment token provisioning with variable risk evaluation. In embodiments, a payment token issuer, such as a financial institution, may, with a payment token service provider, provision a payment token for an account that may be associated with a third party that is the account system of record.

In another embodiment, a payment token issuer may outsource some or all of the payment token issuing services to a third-party processor.

Figure 1:
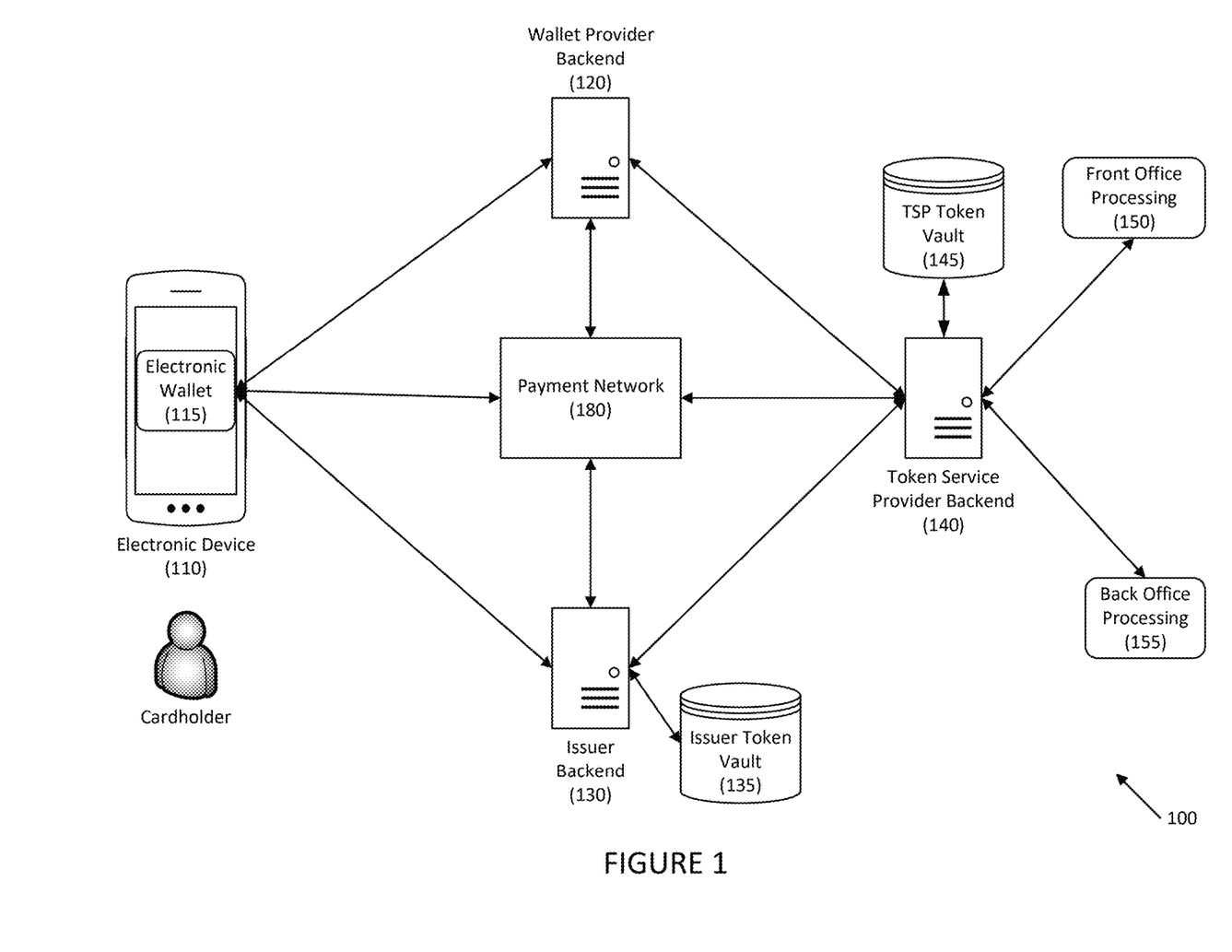
FIG. 1 depicts a system for issuer-hosted payment token provisioning with variable risk evaluation according to an embodiment.

Referring to FIG. 1, an exemplary system for issuer-hosted variable-risk payment token provisioning is provided according to one embodiment. System 100 may include electronic device 110, which may be any suitable electronic device such as smart phones, computers (e.g., tablet, notebook, desktop, etc.), Internet of Things (IoT) appliances, smart watches, smart rings, smart glasses, etc. Electronic device 110 may be associated with a cardholder.

Electronic device 110 may execute an application, such as electronic wallet 115. Electronic wallet 115 may be a payment application, may be an issuer-specific electronic wallet, etc.

Electronic wallet 115 may communicate with wallet provider backend 120, which may be a financial institution, a financial technology (FinTech) entity, etc., and with issuer backend 130. Issuer backend 130 may be associated with the issuer for a financial instrument to be provisioned to electronic wallet 115.

In one embodiment, issuer backend 130 and wallet provider backend 120 may be provided or associated with the same entity (e.g., the same financial institution).

Issuer backend 130, wallet provider backend 120, and token service provider backend 140 may communicate with, and via, payment network 180. Payment network 180 may be any suitable payment network, such as VisaNet, ChaseNet, etc.

In one embodiment, electronic wallet 115 may communicate with payment network 180 directly, or via wallet provider backend 120.

Wallet provider backend 120 and issuer backend 130 may communicate with token service provider backend 140. Token service provider backend 140 may be provided by, or part of, payment network 180.

Token service provider backend 140 may communicate with front office processing 150 and back office processing 155. In one embodiment, token service provider backend 140 may provide provisioning risk details to front office processing 150 and back office processing 155 for consideration in decisioning a transaction.

In one embodiment, issuer backend 130, which may be a backend for a financial institution, and token service provider backend 140 may work together to provision a payment token for the account. Examples of third-party token service providers are disclosed in U.S. patents application Ser. Nos. 16/576,982 and 62/734,301, the disclosures of which are hereby incorporated, by reference, in their entireties.

In one embodiment, issuer backend 130 may apply its risk checks during the provisioning process, and token service provider 140 may provide the mapping between a payment token and the account. Issuer backend 130 may then provide the payment token to the account system of record, such as electronic wallet 115 hosted by wallet provider backend 120 as a payload (e.g., a DPAN payload). Issuer may further provide payment token servicing, which may include unassisted and advisor-assisted servicing.

Issuer backend 130 may manage the "send to" addresses for the one-time passcodes. The velocity of channel attacks for the one-time passcodes may be managed by issuer backend 130 across a plurality of channels. For example, issuer backend 130 may dynamically select the channel for communicating the one-time passcode that is most secure (e.g., email, SMS, voice message, in-app messaging, etc.).

Issuer backend 130 may be associated with issuer token vault 135, and token service provider backend may be associated with token service provider (TSP) token vault 145. Token vaults 135 and/or 145 may maintain mappings of payment tokens to primary account numbers, risk profiles, payment token origin information, etc.

Figure 2:
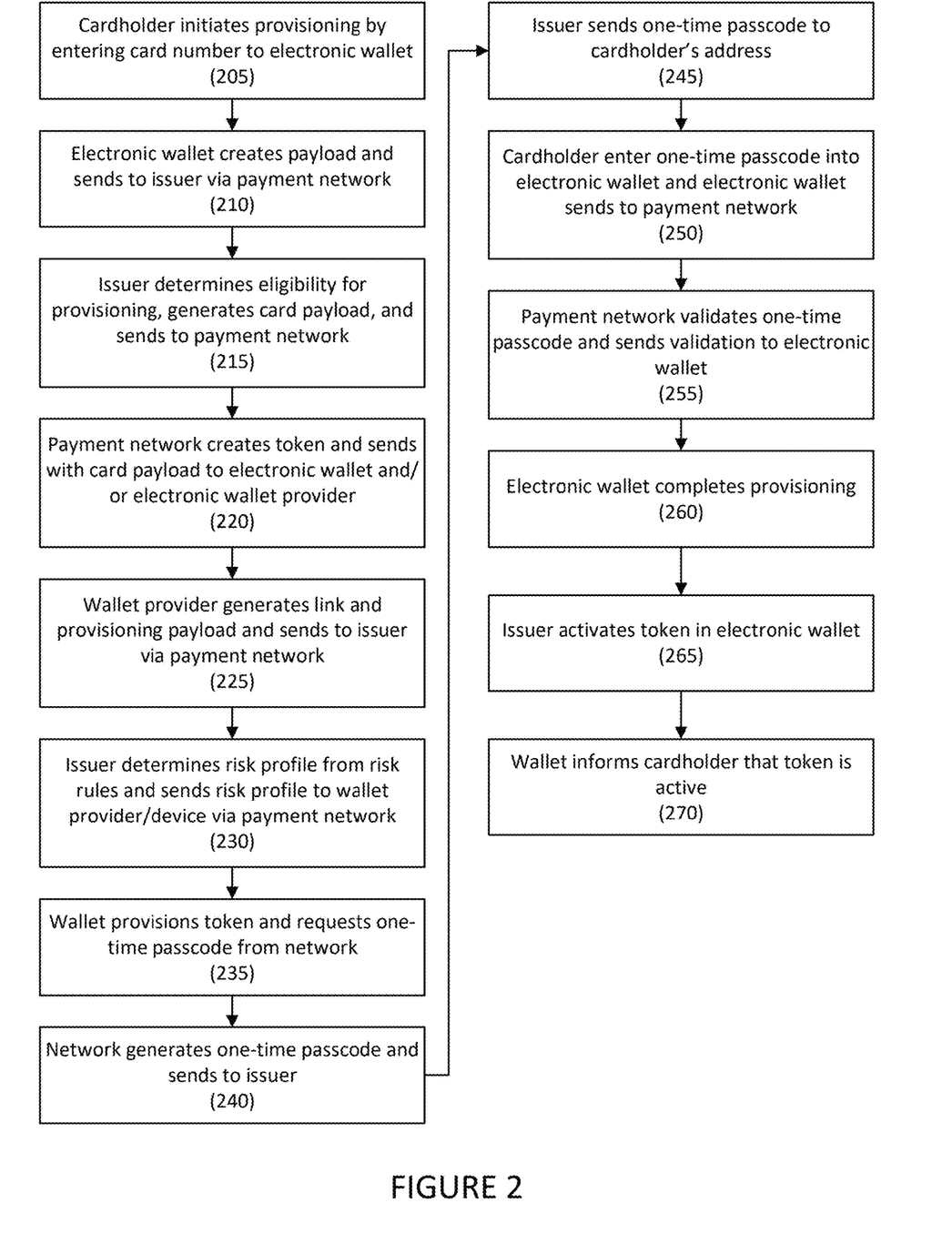
FIG. 2 depicts a method for issuer-hosted payment token provisioning with variable risk evaluation according to an embodiment.

Referring to FIG. 2, a method for variable-risk payment token provisioning is disclosed according to an embodiment.

In step 205, a cardholder may initiate provisioning by entering information, such as a card number for a card to be provisioned, to the cardholder's electronic wallet application.

In step 210, the electronic wallet application may create a payload and may send the payload to the issuer via a payment network. In one embodiment, the payload may be a device-bound payload that is specifically bound to a physical device (e.g., the payload is bound to a smartphone through a wallet. In another embodiment, the payload may be bound to a service and not a physical device. Device-bound payloads and service-bound payloads may have different risk profiles, as with a device-bound payload, additional information about the device (e.g., location, other application on the device, how the device has been used in the past, etc.) versus a service-bound payload, which may only receive information from a server. In one embodiment, the device- or service-bound payload may identify the specific device or service to which the payload is bound.

In one embodiment, a service-bound payload may be for a payment token that may be stored with an on-line merchant. For example, instead of the on-line merchant storing the customer's credit card number on file, the issuer may digitally provision a payment token to the on-line merchant. The payment token may be restricted to the specific on-line merchant, may be limited to a certain amount, etc.

In embodiments, type of payment token (e.g., device-bound or service-bound) may be used to restrict the use of the payment token (e.g., a payment token bound to a first device should not be present on-line or used with a second device. Further certain devices may provide additional data points (e.g., GPS location, operating system version, installed application information, etc.) that may be used in the authorization process.

In step 215, the issuer may receive the device- or service-bound payload from the electronic wallet application and may determine the eligibility of the card for provisioning. From the device- or service-bound payload, the issuer may then generate a card payload, and may send the card payload to the payment network. In one embodiment, the card payload may be a subset of the device- or service-bound payload.

In step 220, the payment network may create a payment token and may send the payment token with the card payload to electronic wallet or the wallet provider backend. The payment token may further include payment token origin information regarding the origin of the payment token, such as the identification of the electronic wallet, whether the payment token is device- or service-bound, an identification of the issuer, an identification of the payment network, an identification of the applications installed on the electronic device, the trustworthiness of the installed applications, the location of the electronic device at the time of provisioning, whether the token is being provisioned "in-flight" (e.g., as part of a transaction), any in-flight information (e.g., merchant information, merchant risk, etc.), etc. This information may also be stored in a token issuer vault.

In one embodiment, this information may be provided to the issuer through receipt of the payment token as part of an authorization, or it may be provided as a result the provisioning payload (e.g., as part of the one-time passcode request, any reply to any provisioning requests, etc.), out of band if the provisioning was offboarded to a third-party processor, etc.

In step 225, the wallet provider may generate a link and provisioning payload and may send the link and provisioning payload to the issuer via the payment network. The link and provision payload may include information necessary to link the account from the issuer (e.g., the primary account number) to the payment token, and to provision the payment token to the electronic wallet.

In step 230, the issuer may determine a risk profile for the payment token by applying risk rules, and may send the risk profile to the wallet provider and/or electronic device via the payment network. In one embodiment, the issuer's risk engines may consider wallet scores, device scores, profile scores, and location-based scores across one or more channels. For example, the device history, location history, usage of the device versus usage of the account (e.g., the account may have three purchases across three states in ten minutes, some of which had the device present), other application on the device (e.g., is the issuer's application on the device, what risk profile does that application have), did the device have another user's accounts on it before (e.g., was the device stolen, re-sold, etc.), etc. Any suitable considerations may be considered as is necessary and/or desired.

The issuer may manage eligible products centrally and may check cardholder eligibility.

In one embodiment, the application of the risk rules may result in a risk profile associated with a score (e.g., 1-10), a rating (e.g., red-yellow-green), a letter grade (A-F), or any other suitable ranking that may be used to indicate a risk associated with the use of the payment token. The risk profile may be based on, for example, the issuer not fully vetting the user because the issuer may have partial user information, stale user information, concerns regarding the device, wallet, or platform, etc. For example, some electronic wallets are transferred to a new device when the user switches devices (e.g., the user gets a new smartphone) with limited security checks. To the issuer, the device is a new device; thus, the issuer may indicate such in the risk profile because the issuer has not fully vetted the user and the device. Thus, if the issuer is push provisioning a new account/card on that device, purchase authorizations may be limited, such as to an initial transaction, until the issuer has an opportunity to further validate the user and the device.

In one embodiment, the risk profile may be used to restrict the dollar amount for the transaction, impose geographical restrictions, time restrictions, limits on the number of transactions, etc. It may further provide messaging to the merchant or the cardholder to complete additional authentication with the issuer to eliminate or minimize such restrictions.

In one embodiment, certain servicing aspects may impact the risk attributes that may be applied to a payment token. For example, a customer may request having a payment token pushed to the customer's device. To do this, different levels of authentication may be applied to the customer, and the authentication attributes may be used to store or associate risk attributes from the authentication process with the payment token. This may assist in understanding how the payment token was provisioned. Thus, if a light weight authentication process was used, the transaction authorization process may be more closely restricted than if a full authentication process was used.

In step 235, the wallet may provision the payment token based on the risk profile, and may request cardholder verification from the payment network using, for example, a one-time passcode.

In step 240, the payment network may generate a one-time passcode and may send the one-time passcode to the issuer.

In step 245, the issuer may retrieve contact information for the cardholder and may send the one-time passcode to the cardholder's contact information (e.g., phone number/SMS address, email address, etc.). For example, the one-time passcode may be sent by SMS to the cardholder's phone number, by email to the user's email address, by a phone call to the cardholder's phone number, by a push message to an issuer application executed on the cardholder's electronic device, etc.

In step 250, the cardholder may receive and enter the one-time passcode into the electronic wallet, and the electronic wallet may send the entered one-time passcode to the payment network.

In step 255, the payment network may validate the entered one-time passcode received from the electronic wallet and may send the validation result to the electronic wallet.

If, in step 260, the entered one-time passcode was validated, the electronic wallet may complete provisioning. The electronic wallet may notify the issuer that provisioning is complete.

In step 265, the issuer may then activate the payment token in the electronic wallet, and, in step 270, the wallet may notify the cardholder that the payment token is active.

Figure 3:
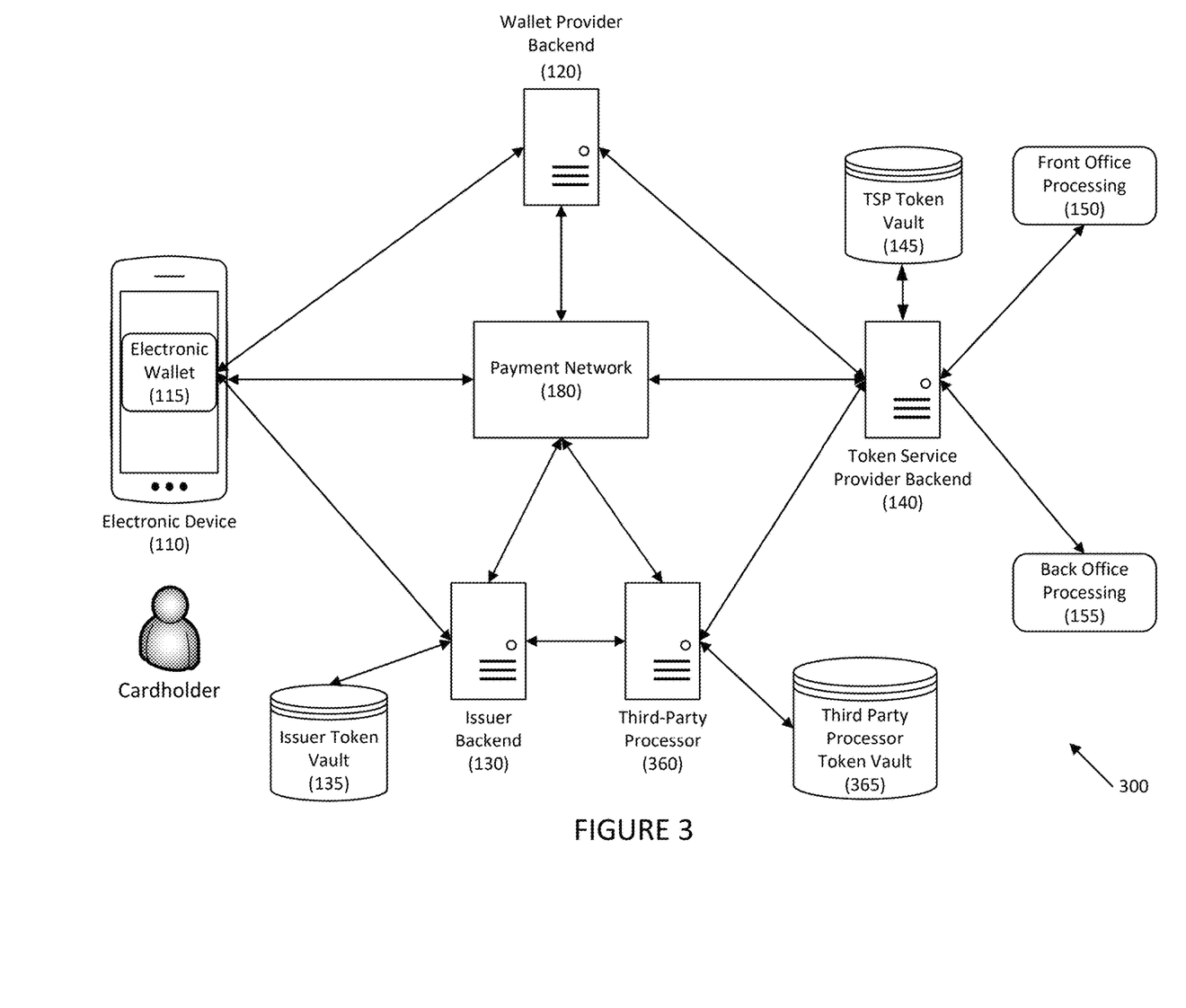
FIG. 3 depicts a system for a hybrid-hosted payment token provisioning with variable risk evaluation according to an embodiment.

Referring to FIG. 3, a system for variable-risk payment token provisioning using a hybrid system is disclosed according to an embodiment. In one embodiment, issuer backend 130, token service provider backend 140, and third-party processor backend 360 may work together to provision a payment token for the account.

System 300 is similar to system 100 but includes third-party processor 360. Third-party processor 360 may function as stand-in processor when issuer backend 130 outsources the creation of the underlying account. Authorization may be routed to third-party processor 360 instead of to issuer backend 130. Because of this, a payment token issued by third-party processor 360 may have a different risk profile from a payment token issued by issuer backend 130.

In one embodiment, third-party processor 360 may have third-party processor token vault 365, or it may rely on the payment network's token vault (not shown). In one embodiment, third-party processor 360 may include a pointer to the risk profiles should such be needed during an authorization.

Figure 4:
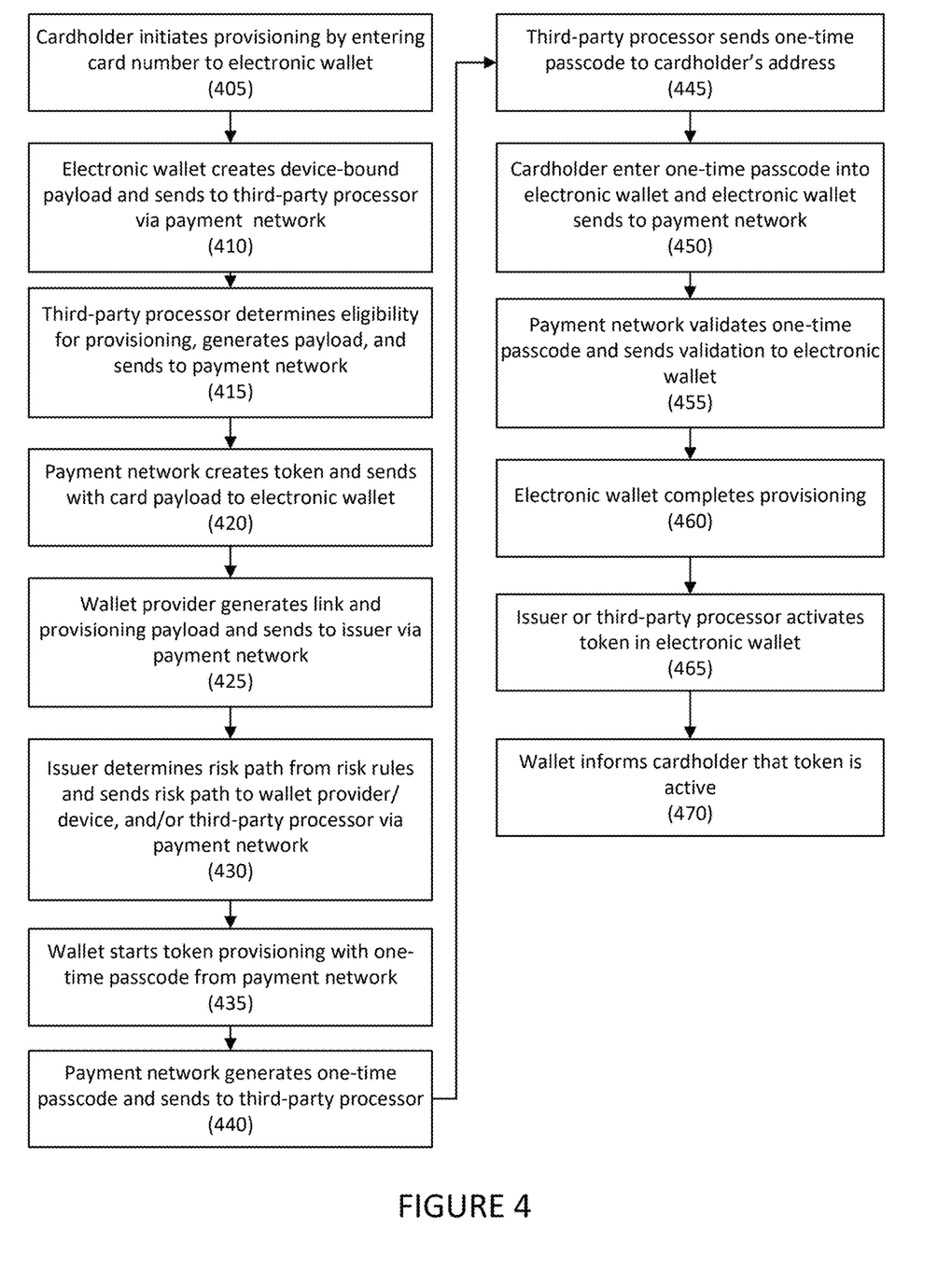
FIG. 4 depicts a method for a hybrid-hosted payment token provisioning with variable risk evaluation according to an embodiment.

Referring to FIG. 4, a method for variable-risk payment token provisioning using a hybrid system is disclosed according to an embodiment. In embodiments, some, or all, of the steps performed by the issuer backend in the embodiment of FIGS. 1 and 2 may be performed by a third-party processor. For example, the third-party processor may function as a proxy for the issuer. During provisioning, the identity of which entity performed which steps may be stored in order to determine the risk associated with a transaction involving the payment token.

In step 405, a cardholder may initiate provisioning by entering information, such as a card number for a card to be provisioned, to the cardholder's electronic wallet application.

In step 410, the electronic wallet application may create a payload and may send the payload to the issuer and/or a third-party processor via a payment network. In one embodiment, the payload may be a device-bound payload that is specifically bound to a physical device (e.g., the payload is bound to a smartphone through a wallet. In another embodiment, the payload may be bound to a service and not a physical device. Device-bound payloads and service-bound payloads may have different risk profiles, as with a device-bound payload, additional information about the device (e.g., location, other application on the device, how the device has been used in the past, etc.) versus a service-bound payload, which may only receive information from a server. In one embodiment, the device- or service-bound payload may identify the specific device or service to which the payload is bound.

In step 415, the issuer and/or third-party processor may receive the device- or service-bound payload from the electronic wallet application and may determine the eligibility of the card for provisioning. From the device- or service-bound payload, the issuer third-party processor may then generate a card payload, and may send the card payload to the payment network. In one embodiment, the card payload may be a subset of the device- or service-bound payload.

In step 420, the payment network may create a payment token and may send the payment token with the card payload to electronic wallet or the wallet provider backend In step 425, the wallet provider may generate a link and provisioning payload and may send the link and provisioning payload to the issuer and/or the third-party processor via the payment network. The link and provision payload may include information necessary to link the account from the issuer (e.g., the primary account number) to the payment token, and to provision the payment token to the electronic wallet.

In step 430, the issuer may determine a risk profile for the payment token by applying risk rules, and may send the risk profile to the wallet provider and/or electronic device via the payment network. In one embodiment, the issuer may also send the risk profile to the third-party provider. In one embodiment, the issuer's risk engines may consider wallet scores, device scores, profile scores, and location-based scores across one or more channels. For example, the device history, location history, usage of the device versus usage of the account (e.g., the account may have three purchases across three states in ten minutes, some of which had the device present), other application on the device (e.g., is the issuer's application on the device, what risk profile does that application have), did the device have another user's accounts on it before (e.g., was the device stolen, re-sold, etc.), etc. Any suitable considerations may be considered as is necessary and/or desired.

The issuer may manage eligible products centrally and may check cardholder eligibility.

In step 435, the wallet may provision the payment token based on the risk path, and may request cardholder verification from the payment network using, for example, a one-time passcode.

In step 440, the payment network may generate a one-time passcode and may send the one-time passcode to the issuer and/or the third-party processor.

In step 445, the issuer and/or third-party processor may retrieve contact information for the cardholder and may send the one-time passcode to the cardholder's contact information (e.g., phone number/SMS address, email address, etc.). For example, the one-time passcode may be sent by SMS to the cardholder's phone number, by email to the user's email address, by a phone call to the cardholder's phone number, by a push message to an issuer application executed on the cardholder's electronic device, etc.

In one embodiment, the third-party processor may communicate the one-time passcode to the issuer, so that the issuer may push a message to the issuer application.

In step 450, the cardholder may receive and enter the one-time passcode into the electronic wallet, and the electronic wallet may send the entered one-time passcode to the payment network.

In step 455, the payment network may validate the entered one-time passcode received from the electronic wallet and may send the validation result to the electronic wallet.

If, in step 460, the entered one-time passcode was validated, the electronic wallet may complete provisioning. The electronic wallet may notify the issuer and/or the third-party provider that provisioning is complete.

In step 465, the issuer and/or third-party processor may then activate the payment token in the electronic wallet, and, in step 470, the wallet may notify the cardholder that the payment token is active.

Figure 5:
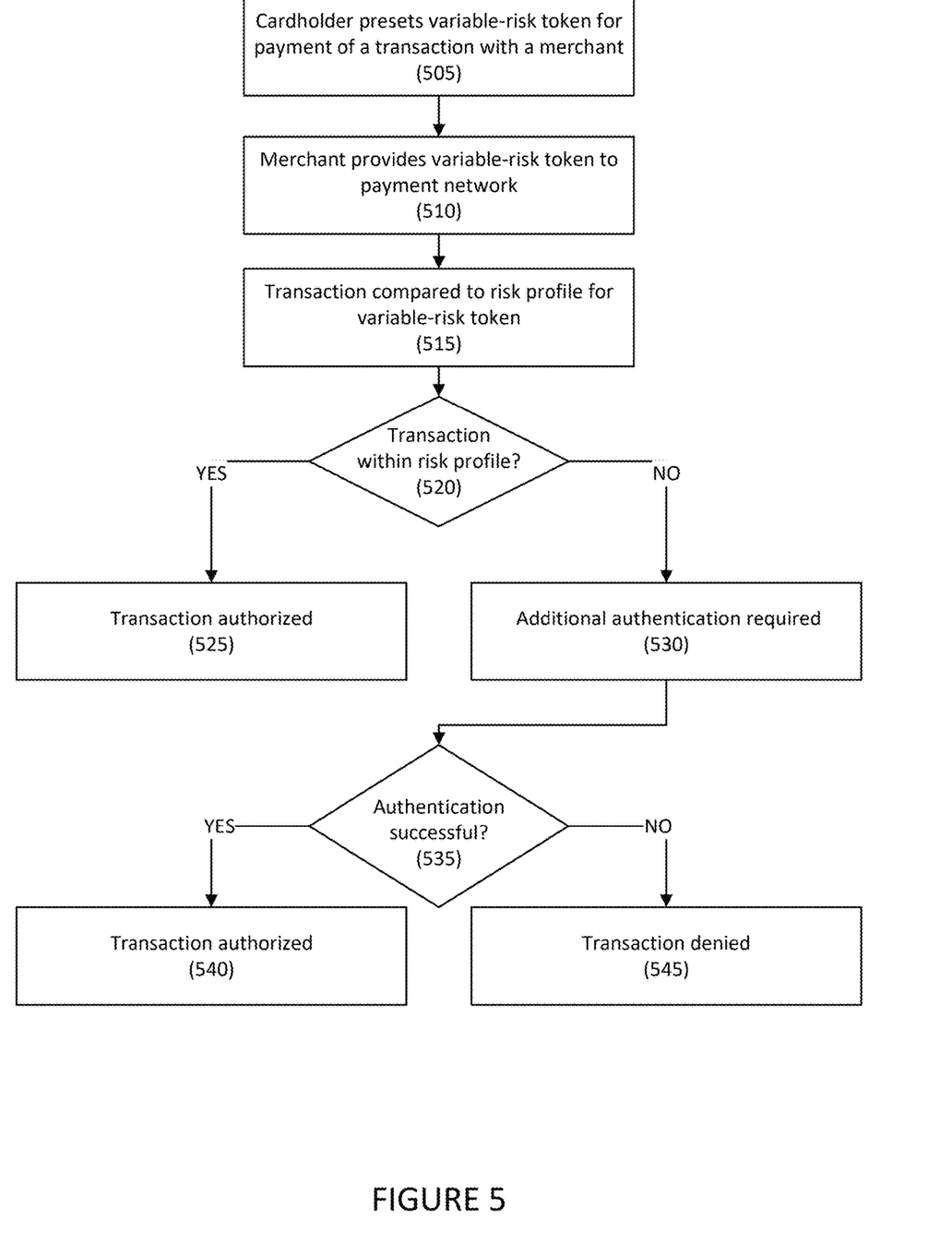
FIG. 5 depicts a method for conducting a transaction with variable-risk payment token according to an embodiment.

Referring to FIG. 5, a method for conducting a transaction with variable-risk payment token is disclosed according to an embodiment.

In step 505, a cardholder may present a variable-risk payment token for payment to a merchant using, for example, an electronic wallet.

In step 510, the merchant may communicate the variable-risk payment token and the payment authorization request to the payment network.

In step 515, the authorization request may be decisioned. In one embodiment, the payment network may perform at least some of the decisioning. In another embodiment, the payment network may only perform domain-specific decisioning to prevent, for example, an ApplePay payment token from being used in a GooglePay wallet).

In one embodiment, the issuer backend may retrieve the risk profile for the payment token from, for example, a token vault, and may evaluate the transaction in view of the risk profile. For example, the risk profile may limit the amount of the transaction, the geographical region for the transaction, the number of transactions, etc.

In step 520, if the transaction is within the scope of the risk profile, in step 525, the transaction may be authorized and processed in a business-as-usual manner.

If, in step 520, the transaction is not within the scope of the risk profile, in step 530, additional authentication may be requested. For example, out-of-band authentication, biometric authentication, in-app authentication (e.g., log in to the issuer application on the electronic device), etc. may be used.

In one embodiment, different types of additional authentication, or combinations thereof, may be used depending on the risk profile and/or the transaction.

In step 535, if the authentication is successful, in step 540, the transaction may be authorized and processed in a business-as-usual manner.

In step 540, if the authentication is not successful, in step 545, the transaction may be denied.

It should be recognized that although several embodiments have been disclosed, these embodiments are not mutually exclusive, and features from one embodiment may be used with other embodiments as is necessary and/or desired.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for payment token provisioning with variable risk evaluation, comprising:
    receiving, by an issuer backend for an issuer comprising at least one computer processor and from an electronic wallet application executed by a mobile electronic device and from a payment network, a device-bound payload comprising an identification of a card to be provisioned to the mobile electronic device and an identification of the mobile electronic device, wherein the card is issued to a cardholder;
    determining, by the issuer backend, that the card is eligible for provisioning to the mobile electronic device;
    generating, by the issuer backend, a card payload and communicating the card payload to the payment network, wherein the card payload comprises a subset of the payload received from the electronic wallet application, and the payment network creates a device-bound payment token for the card comprising payment token origin information, wherein the device-bound payment token is restricted to use with the mobile electronic device and comprises an identification of the electronic wallet application, an identification of the issuer, and an identification of mobile electronic device at a time of provisioning;
    receiving, by the issuer backend, a link for a provisioning payload for the device-bound payment token from the payment network;
    assessing, by the issuer backend, device ownership history for the mobile electronic device;
    generating, by the issuer backend, a risk profile for the device-bound payment token, wherein the risk profile is based on the device ownership history of the mobile electronic device, a location history for the mobile electronic device received from the mobile electronic device, and an identification of an authentication processes associated with a request for the generation of the device-bound token;
    restricting, by the issuer backend, use of the device-bound payment token based on the risk profile;
    receiving, by the issuer backend, a one-time passcode from the payment network;
    dynamically selecting, by the issuer backend, a communication channel out of a plurality of communication channels for sending the one-time passcode, wherein the selection of the communication channel is based on a velocity of attacks on each of the plurality of channels;
    sending, by the issuer backend, the one-time passcode to contact information for the cardholder via the selected communication channel, wherein the electronic wallet application is configured to receive the one-time passcode and to forward the one-time passcode to the payment network for validation;
    activating, by a third-party processor backend, the device-bound payment token in response to the validation;
    receiving, by the payment network, the device-bound payment token as part of a transaction;
    performing, by the payment network, domain-specific decisioning on the transaction; and
    performing, by the issuer backend, risk-based decisioning on the transaction based on the risk profile associated with the device-bound payment token;
    wherein the transaction is rejected in response to the domain-specific decisioning or the risk-based decisioning failing.

2. The method of claim 1, wherein the payload received from the electronic wallet application further comprises a service-bound payload, and the payment token is restricted to use with a merchant.

3. The method of claim 1, wherein the payment token origin information comprises at least one of an identification of the electronic wallet, an identification of the issuer, an identification of the payment network, an identification of at least one application installed on the mobile electronic device, a trustworthiness of the at least one installed application, a location of the mobile electronic device when the payload comprising an identification of the card to be provisioned to the mobile electronic device was sent, whether the payment token is being provisioned in-flight, and any in-flight information.

4. The method of claim 1, wherein the risk profile is further based on at least one of a wallet score for the electronic wallet, a transaction history for the card, and a profile score for the cardholder.

5. The method of claim 1, wherein the device-bound payment token is restricted to a transaction dollar amount.

6. The method of claim 1, wherein the device-bound payment token is restricted to a number of transactions.

7. A method for payment token provisioning with variable risk evaluation, comprising:
    receiving, by a third-party processor backend for an issuer comprising at least one computer processor and from an electronic wallet application executed by a mobile electronic device over a payment network, a payload comprising an identification of a card to be provisioned to the mobile electronic device, wherein the card is issued to a cardholder;
    determining, by the third-party processor backend, that the card is eligible for provisioning to the mobile electronic device;
    creating, by the third-party processor backend, a card payload, wherein the card payload comprises a subset of the payload received from the electronic wallet application;
    communicating, by the third-party processor backend, the card payload to the payment network, wherein the payment network is configured to create a variable risk payment token for the card comprising payment token origin information, wherein the variable risk payment token comprises an identification of the electronic wallet application, an identification of the issuer, and an identification of mobile electronic device at a time of provisioning;

receiving, by the third-party processor backend, the variable risk payment token from the payment network;

generating, by the third-party processor backend, a risk profile for the payment token, wherein the risk profile is associated with at least one restriction on using the payment token, and wherein an issuer backend for the issuer is configured to receive a device ownership history for the mobile electronic device and to generate a risk profile based on the device ownership history of the mobile electronic device, a location history for the mobile electronic device received from the mobile electronic device, and an identification of an authentication processes associated with a request for the generation of the variable risk payment token;

receiving, by the third-party processor backend, a one-time passcode from the payment network;

sending, by the third-party processor backend, the one-time passcode to contact information for the cardholder via a selected communication channel that is dynamically selected based on a velocity of attacks on each of the plurality of channels, wherein the electronic wallet application is configured to receive the one-time passcode and to forward the one-time passcode to the payment network for validation;

activating, by the third-party processor backend, the variable risk payment token in response to the validation;

receiving, by the payment network, the variable risk payment token as part of a transaction;

performing, by the payment network, domain-specific decisioning on the transaction; and performing, by the issuer backend, risk-based decisioning on the transaction based on the risk profile associated with the variable risk.

8. The method of claim 7, further comprising:
retrieving, by the third-party processor backend, the contact information for the cardholder from the issuer backend.

9. The method of claim 7, wherein the payload received from the electronic wallet application further comprises a service-bound payload, wherein the service-bound payload binds the payment token to a merchant.

10. The method of claim 7, wherein the payment token origin information comprises at least one of an identification of the electronic wallet application, an identification of the issuer, an identification of the payment network, an identification of at least one application installed on the mobile electronic device, a trustworthiness of the at least one installed application, a location of the mobile electronic device when the payload comprising an identification of the card to be provisioned to the mobile electronic device was sent, whether the payment token is being provisioned in-flight, and any in-flight information.

11. The method of claim 7, wherein the risk profile is further based on at least one of a wallet score for the electronic wallet, a transaction history for the card, and a profile score for the cardholder.

12. The method of claim 1, further comprising:
determining, by the electronic wallet application, that an issuer application for the issuer is present on the mobile electronic device; and
receiving, by the issuer backend and from the mobile electronic device, an identification that the issuer application;
wherein the risk profile is further based on the presence of the issuer application on the mobile electronic device.

13. The method of claim 1, further comprising:
retrieving, by the issuer backend and from the mobile electronic device, location data for the mobile electronic device;
wherein the risk profile is further based on the location data for the mobile electronic device.

14. The method of claim 1, further comprising:
identifying, by the electronic wallet application, a plurality of applications that are present on the mobile electronic device;
receiving, by the issuer backend and from the mobile electronic device, the identification of applications on the mobile electronic device; and
determining, by the issuer backend and from the mobile electronic device, a trustworthiness of the plurality of applications;
wherein the risk profile is further based on the trustworthiness of the plurality of applications on the mobile electronic device.

15. The method of claim 7, wherein the electronic wallet application is configured to determine that an issuer application for the issuer is present on the mobile electronic device, and the issuer backend is configured to receive an identification that the issuer application from the mobile electronic device, wherein the risk profile is further based on the presence of the issuer application on the mobile electronic device.

16. The method of claim 7, wherein the issuer backend is configured to receive location data for the mobile electronic device from the mobile electronic device, wherein the risk profile is further based on the location data for the mobile electronic device.

17. The method of claim 7, wherein the electronic wallet application is configured to identify a plurality of applications that are present on the mobile electronic device, and the issuer backend is configured to receive the identification of applications on the mobile electronic device and to determine a trustworthiness of the plurality of applications on the mobile electronic device, wherein the risk profile is further based on the trustworthiness of the plurality of applications on the mobile electronic device.

* * * * *